United States Patent [19]
Nilsson

[11] 3,779,438
[45] Dec. 18, 1973

[54] APPARATUS FOR MAINTAINING A PREDETERMINED RELATIVE POSITION OF A MOVING WEB OF MATERIAL AND AN ELEMENT

[75] Inventor: Erling Ingvar Nilsson, Lund, Sweden

[73] Assignee: AB Kelva, Lund, Sweden

[22] Filed: Apr. 11, 1972

[21] Appl. No.: 243,077

[30] Foreign Application Priority Data
Apr. 14, 1971 Sweden.............................. 4798/71

[52] U.S. Cl..................................... 226/19, 226/22
[51] Int. Cl............................................ B65h 25/26
[58] Field of Search........................... 226/19, 22, 24

[56] References Cited
UNITED STATES PATENTS
3,442,428    5/1969    Nilsson ............................... 226/19

Primary Examiner—Allen N. Knowles
Assistant Examiner—Gene A. Church
Attorney—Allan R. Fowler et al.

[57] ABSTRACT

An apparatus for maintaining a predetermined position of a moving web of material in relation to an element comprises a pneumatic sensing means, and a control valve having a pressure chamber formed between two diaphragms. The pressure in this pressure chamber is governed by a pressure signal supplied by the sensing means in dependence of the position of the web in relation to the element. The diaphragms are operatively connected with valve members controlling the pressure in a pressure box for adjusting the position of the web in dependence of the pressure in the pressure chamber.

6 Claims, 1 Drawing Figure

PATENTED DEC 18 1973 3,779,438
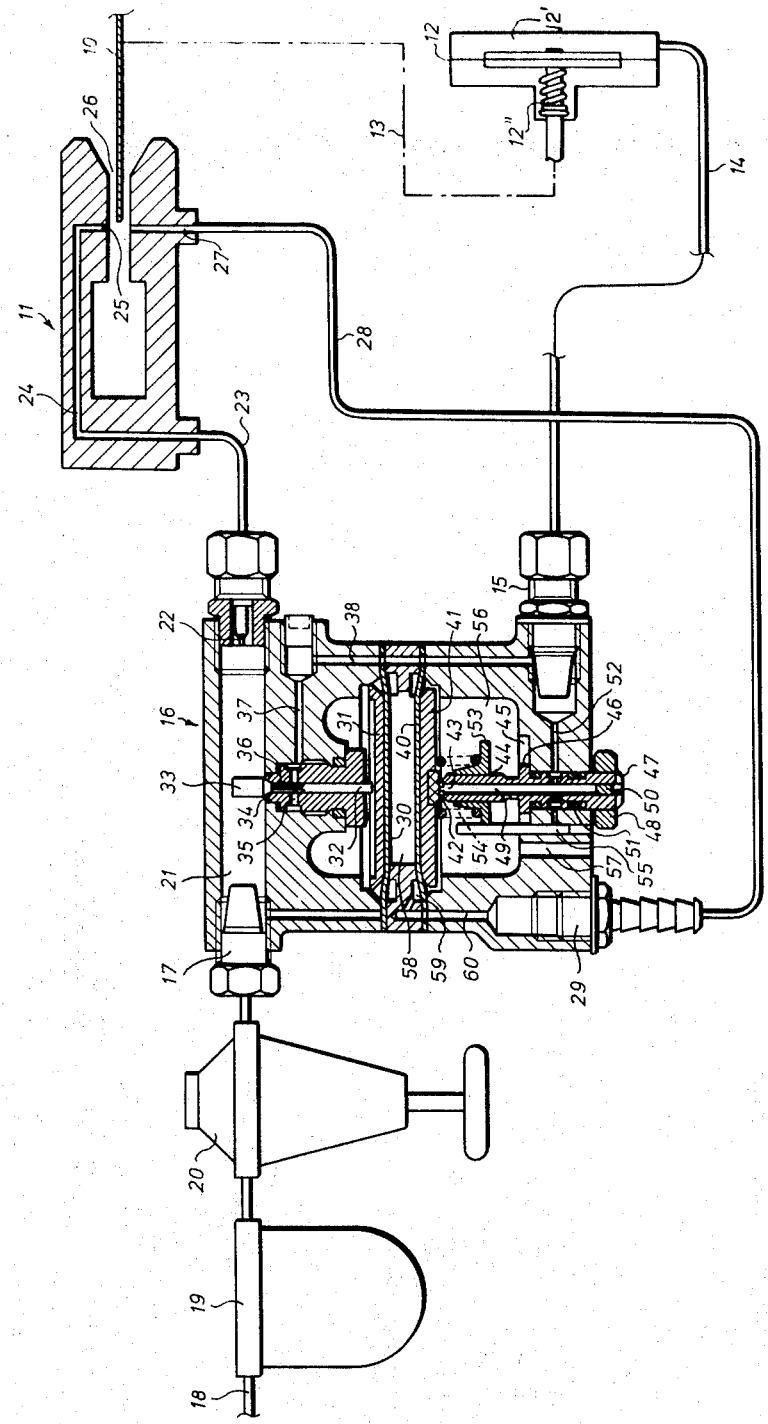

APPARATUS FOR MAINTAINING A PREDETERMINED RELATIVE POSITION OF A MOVING WEB OF MATERIAL AND AN ELEMENT

The present invention relates to an apparatus for maintaining a predetermined relative position of a moving web of material and an element.

An apparatus of this kind is disclosed in U.S. Pat. Specification No. 3,442,428.

An object of the invention is to provide an apparatus of the kind referred to which is of a simpler construction, is easier to adjust and provides a more reliable operation than that disclosed in said patent.

This object is achieved according to the invention by providing an apparatus of the kind referred to comprising a sensing means to be passed by pressurized air, for determining the relative position of one margin of the web and the element by an air flow through the sensing means, corresponding to said position; a pneumatic pressure means for providing a relative movement of the web and the element; and a control valve having an inlet for pressurized air from a source of pressurized air and a connection, controlled by the valve, for pressurized air to and from the pressure means, said valve having diaphragm means including two diaphragms, a valve member, normally closed, to be actuated by one of the diaphragms for controlling a connection between the inlet for pressurized air and the connection to the pressure means, a second valve member, normally closed, to be actuated by the other one of the diaphragms for controlling a connection between the pressure means and the atmosphere, and a pressure chamber defined between the diaphragms, which is connected to the sensing means to maintain a pressure directly proportional to the flow of pressurized air through the sensing means, said first-mentioned diaphragm being arranged to open the connection between the inlet for pressurized air and the pressure means at a deviation, in one sense, from a pressure in the pressure chamber corresponding to the predetermined relative position and the other one being arranged to open the connection between the pressure means and the atmosphere at a deviation in the other sense, for changing the air pressure in the pressure means by the control valve to restore said relative position by a relative movement of the web and the element, provided by the pressure means.

An embodiment of the apparatus according to the invention will be described in more detail in the following, reference being made to the drawing which discloses diagramatically, partly in vertical sectional view, an apparatus according to the invention.

In the drawing there is disclosed in fragmentary cross-sectional view a web 10 of a material, such as paper, and it is imagined that this web runs through a machine such as a printing machine, a cutting machine or a laminating machine wherein it is important that a predetermined lateral position of the web is maintained in relation to operating members mounted on the machine frame. For sensing said predetermined relative position there is provided a sensing means 11 which may be mounted on the machine frame or on an operating member provided therein, and for adjusting the lateral position of the web in relation to the sensing means 11 there is provided a pneumatic pressure box 12 which is operatively connected to guide rollers or the like guiding the web laterally; the operative connection between pressure box 12 and such rollers or the like is indicated in the drawing by a dash-and-dot line 13 between the pressure box and the web. The pressure box is of a known construction having a pressure chamber 12' for adjustment in one direction and a pressure spring 12" for adjustment in the opposite direction. Instead of being arranged to adjust the position of web 10 the pressure box 12 may be connected with a carriage mounted in the machine frame to be movable in relation to web 10, sensing means 11 and one or more operating members being carried by such carriage. For maintaining a pressure in pressure chamber 12' of pressure box 12 this chamber is connected by a conduit 14 to a connection 15 of a control valve 16 which is connected by an inlet 17 to a conduit 18 for pressurized air through a filter 19 for separating dirt and water and a pressure regulator 20. Inlet 17 for pressurized air communicates with a passage 21 in the valve body of control valve 16, and this passage is connected through a throttle passage 22 and by a conduit 23 to a passage 24 in sensing means 11 said latter passage having a nozzle aperture 25 which opens into a slot 26 in the sensing means opposite to a passage 27 which is connected by a conduit 28 to an inlet 29 of control valve 16. One marginal portion of web 10 passes to a more or less substantial extent through slot 26.

Control valve 16 connected as described above controls the pressure in pressure box 12 in dependence of pressure signals from sensing means 11 and combines two valve functions. For one of these there is clamped in the valve body a diaphragm 30 which carries a heavy plate 31 forming a load on the diaphragm. This plate is engageable with a valve stem 32 formed at one end thereof with a valve member 33 which co-operates with a seat 34 to control a connection between passage 21 and a passage 35 through grooves 36 in the valve stem. Passage 35 communicates with a passage 37 which in turn communicates with connection 15 through a passage 38, connection 15 being connected through conduit 14 to pressure chamber 12' in pressure box 12. For the other valve function there is clamped in the valve body of control valve 16 a second diaphragm 40, and this diaphragm too carries a heavy plate 41 forming a load on the diaphragm. In this plate there is fitted a seal 42 adapted to co-operate with a seat 43 formed by the end of a tubular pin 44. This pin is rotatably mounted in a recess 45 in the valve body by means of an annular flange 46 and projects from the valve body, the outer end thereof being formed with a screw-driver's groove 47 and provided with a locking nut 48. Necessary seals are provided between pin 44 and the valve body. A passage 49 communicating with seat 43 passes through the pin but is closed to the surroundings at 50. Passage 49 communicates through passages 51 with a passage 52 which in turn communicates with connection 15 having communication through conduit 14 with pressure chamber 12' of pressure box 12. In the valve body there is screwed onto pin 44 a collar 53 forming a support for a pressure spring 54 mounted between such collar and plate 41 this spring biassing diaphragm 40 in the opposite direction to that of plate 41. A pin 55 mounted in the valve body engages a notch in collar 53. By rotating pin 44 by means of a screw-driver inserted into groove 47 collar 53 may be screwed along pin 44 upwardly or downwardly since the collar cannot rotate together with pin 44 due to the engagement with pin 55, and thus there is the possibility to increase or decrease the bias provided by spring 54 on diaphragm 40. Pin 44 can be locked in the adjusted position by tightening nut 48. The part of the interior of the valve body indicated at 56 where passage 49 opens through seat 43 communicates with the surroundings through a bore 57.

Between diaphragms 30 and 40 there is defined in the valve body a chamber 58 connected, through an annular passage 59 and a passage 60 communicating therewith, to inlet 29 which communicates through conduit 28 with passage 27 in sensing means 11. In chamber 58 there will be maintained a pressure controlled by sensing means 11 due to the fact that pressurized air escaping through nozzle aperture 25 in slot 26 through throttle passage 22, conduit 23, and passage 24 creates a pressure in passage 27 such pressure being communicated to chamber 58 through conduit 28, inlet 29, passage 60, and passage 59. The value of this pressure will be dependent of the degree to which nozzle 25 and passage 27 are shielded from each other by the marginal portion of web 10. In a desired lateral relative position of web 10 and sensing means 11 and, thus, the member to which such sensing means is mounted, the margin of web 10 shall be located in a position in the air flow path between nozzle aperture 25 and passage 27 such that there is created in chamber 58 a pressure at which valve member 33 under the gravity load is engaged with the seat 34 thereof and seal 42 under the load of plate 41 is engaged with the seat 43 thereof against the bias of spring 54. Then, pressure chamber 12' of pressure box 12 is not connected to inlet 17 for pressurized air or to connection 57 communicating with the surroundings but is held in an earlier provided adjusted position at the pressure maintained in the pressure box. In this position spring 12'' of the pressure box balances the pressure in pressure chamber 12'.

Now, if it is assumed that web 10 moves to the right as seen in the drawing such that the marginal portion thereof is pulled completely out of the air flow between nozzle aperture 25 and passage 27 in slot 26 or at least will interfere with this air flow to a less degree than before, the pressure in passage 27 will increase and this pressure increase will be communicated through conduit 28, inlet 29, passage 60, and passage 59 to pressure chamber 58. The increased pressure in this chamber will lift diaphragm 30 such that plate 31 will be engaged with stem 32 and, then, will lift valve member 33 from seat 34. Seal 42 will still be held against seat 43 by a larger force than before due to the increased pressure in chamber 58. Since the connection at seat 34 will be opened there will be provided a connection from inlet 17 through passage 21, grooves 36, passage 35, passage 37, passage 38, and connection 15 to conduit 14 for the supply of pressurized air to pressure chamber 12' of the pressure box. Under the action of the increased pressure in pressure chamber 12' provided thereby web 10 will now be moved to the left as seen in the drawing over the operative connection 13 between the pressure box and the web against the bias of pressure spring 12'' such that the web will be moved further into slot 26. When the marginal portion of the web arrives at the predetermined position in the slot the normal pressure in chamber 58, corresponding to such position, will be obtained such that valve member 33 will again engage seat 34 and close the connection between inlet 17 and pressure box 12. This means that the pressure box will stop moving and will maintain the position at which it had arrived, as long as web 10 maintains the predetermined position in relation to sensing means 11.

If it is now assumed that web 10 moves further into slot 26 it will cover to a larger degree the flow path between nozzle aperture 25 and passage 27 so that the pressure in passage 27 will decrease. This pressure change will be communicated as earlier described through conduit 28 to inlet 29 and through passage 60 and passage 59 to chamber 58 wherein the lower pressure will enable spring 54 to lift seal 42 from seat 43 thereof, valve member 33 remaining in the closed position against seat 34. Thus, at seat 43 there will be opened a connection from pressure chamber 12' of the pressure box through conduit 14, connection 15, passage 52, passage 51 and passage 49 to space 56 from which there is provided a connection directly to the surroundings through passage 57. Thus, spring 12'' in pressure box 12 will now be able to move web 10 to the right as seen in the drawing against the lower pressure in pressure chamber 12' in order to reestablish the predetermined lateral relative position of web 10 and sensing means 11. Thereby the normal pressure in chamber 58 of control valve 16 will be achieved, the connection between the pressure box and the surroundings being reclosed by the engagement of seal 42 against seat 43 under the gravity load of plate 41.

By adjustment of collar 53 on pin 44 in the manner described it is possible to adjust the sensibility of the apparatus described the desired relative position being determined by the adjustment of the pressure on the pressure regulator 20 and the area of throttle passage 22.

What I claim is:

1. An apparatus for maintaining a predetermined relative position of a moving web of material and an element, comprising a sensing means to be passed by pressurized air, for determining the relative position of one margin of the web and the element by an air flow through the sensing means, corresponding to said position; a pneumatic pressure means for providing a relative movement of the web and the element; and a control valve having an inlet for pressurized air from a source of pressurized air and a connection, controlled by the valve, for pressurized air to and from the pressure means, said valve having diaphragm means including two diaphragms, a valve member, normally closed, to be actuated by one of the diaphragms for controlling a connection between the inlet for pressurized air and the connection to the pressure means, a second valve member, normally closed, to be actuated by the other one of the diaphragms for controlling a connection between the pressure means and the atmosphere, and a pressure chamber defined between the diaphragms, which is connected to the sensing means to maintain a pressure directly proportional to the flow of pressurized air through the sensing means, said first-mentioned diaphragm being arranged to open the connection between the inlet for pressurized air and the pressure means at a deviation, in one sense, from a pressure in the pressure chamber corresponding to the predetermined relative position and the other one being arranged to open the connection between the pressure means and the atmosphere at a deviation in the other sense, for changing the air pressure in the pressure means by the control valve to restore said relative position by a relative movement of the web and the element, provided by the pressure means.

2. An apparatus as claimed in claim 1 further comprising a load on each diaphragm biassing the diaphragm towards a position in which the valve member associated therewith is in a closed position.

3. An apparatus as claimed in claim 2 further comprising spring means biassing said other diaphragm against the load.

4. An apparatus as claimed in claim 3 wherein the spring bias is adjustable.

5. An apparatus as claimed in claim 1 wherein the sensing means is connected to the inlet for pressurized air in the control valve through a throttle passage for the supply of pressurized air to the sensing means.

6. An apparatus as claimed in claim 1 wherein the sensing means forms a slot receiving the marginal portion of the web, a nozzle aperture for delivering pressurized air, and a passage opposite thereto which is connected with the pressure chamber of the control valve for sensing the pressure created by the air flow, opening into said slot.

* * * * *